R. T. SMITHSON.
Cotton and Hay Press.
No. 211,599  Patented Jan. 21, 1879.
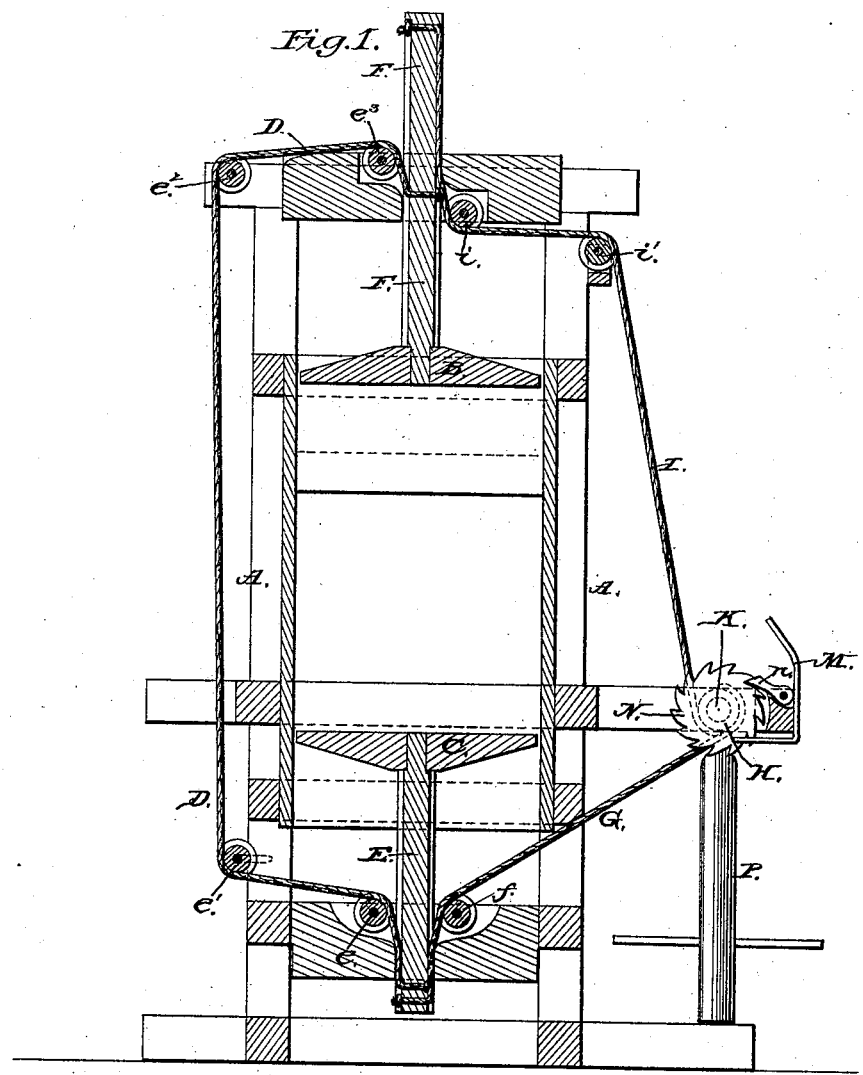
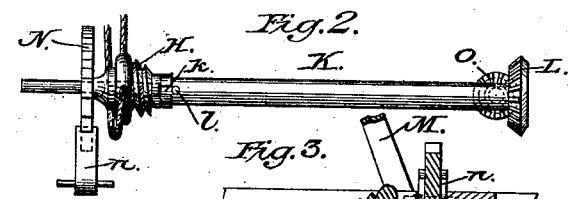
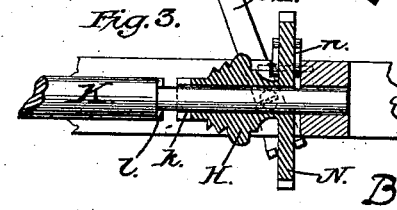
WITNESSES  INVENTOR
R. T. Smithson
By H. J. Ennis
ATTORNEY

UNITED STATES PATENT OFFICE.

RICHARD T. SMITHSON, OF MARSHALL, TEXAS.

IMPROVEMENT IN COTTON AND HAY PRESSES.

Specification forming part of Letters Patent No. 211,599, dated January 21, 1879; application filed December 13, 1878.

*To all whom it may concern:*

Be it known that I, RICHARD T. SMITHSON, of Marshall, in the county of Harrison and State of Texas, have invented certain new and useful Improvements in Cotton and Hay Presses; and I do hereby declare that the following is a full, clear, and exact description thereof, which will enable others skilled in the art to which they appertain to make and use the same, reference being had to the accompanying drawings, and to letters of reference marked thereon, which form a part of this specification.

Figure 1 is a sectional elevation of a hay and cotton press embodying my invention. Fig. 2 is a view of the shaft and drum; and Fig. 3 is a sectional view of same, showing shifting-lever and clutch.

This invention has relation to improvements in baling-presses; and it consists of improvements in the construction of the same, hereinafter more fully described, and particularly pointed out in the claims.

In the accompanying drawings, similar letters of reference indicate like parts of the invention.

A A is an ordinary upright frame, in which work the upper and lower followers, B and C.

A rope or chain, D, is secured to the follower-rod E near its lower end, and passes over the pulleys $e$ $e^1$ $e^2$ $e^3$, and is attached to the upper follower-rod, F, as shown. Another rope or chain, G, is also attached to the lower end of the rod E, passing over the pulley $f$, and thence to the conical drum H. A similar rope, I, is also secured to the extreme upper end of the rod F, and thence passes, by means of the pulleys $i$ $i'$, to the drum H.

The drum H revolves upon the shaft K, and is provided with a clutch formed of the slotted end $k$ of the hub and the pins $l$ of the shaft, the part $k$ engaging with pins $l$ on the shaft K, said clutch $k$ $l$ being thrown in and out of gear by the lever M, which encompasses the ratchet N, rigidly secured to the drum H. The ratchet N is secured at any desired position by the pawl $n$.

The outer end of the shaft is provided with a miter-gear, L, which is operated by a similar miter-gear, O, secured to the upright revolving power-shaft P.

Power being applied to the shaft P, it is communicated to the drum H by means of the gear O and L and clutch $k$. The drum H, being caused to revolve, winds upon itself the ropes or chains G and I, thereby drawing the followers B and C together and compressing the bale.

When the bale is sufficiently compressed, the lever M is thrown to one side by the attendant, thereby holding the compressed bale without the necessity of communicating with the motive power.

After the bale has been suitably strapped or secured, the pawl $n$ is thrown out, the lower follower, C, falls by its own weight, (which is greater than the upper follower, B,) and by means of the rope or chain D raises the upper follower, B, thus simply and quickly separating both of them to their full extent to permit the refilling of the box.

The lever M is operated to throw the clutch into engagement, and the compression is carried on as before.

Having thus described my invention, and the manner of operating the same, what I claim as new and useful, and desire to secure by Letters Patent of the United States, is—

1. In a baling-press, the movable followers B and C, in combination with the rope or chain D, constructed and operating so that the gravitating motion of the lower follower, C, will raise the upper follower, B, substantially as described.

2. In a baling-press, the sliding drum H, having the ratchet N rigidly secured thereto, the clutch $k$ $l$, and shaft K, in combination with the ropes or chains G and I, and followers B and C, substantially as and for the purpose set forth.

In testimony that I claim the foregoing as my own I hereunto affix my signature in presence of two witnesses.

RICHARD T. SMITHSON.

Witnesses:
JAS. F. STARR,
JOHN DURST.